United States Patent
Peng et al.

(10) Patent No.: US 12,530,634 B2
(45) Date of Patent: Jan. 20, 2026

(54) METHOD AND APPARATUS FOR DETERMINING SERVICE AREA OF PARKING LOT, DEVICE, AND STORAGE MEDIUM

(71) Applicant: Shenzhen Institutes of Advanced Technology, Guangdong (CN)

(72) Inventors: Lei Peng, Guangdong (CN); Kangshuai Zhang, Guangdong (CN); Huiyun Li, Guangdong (CN)

(73) Assignee: Shenzhen Institutes of Advanced Technology, Guangdong (CN)

( * ) Notice: Subject to any disclaimer, the term of this patent is extended or adjusted under 35 U.S.C. 154(b) by 1072 days.

(21) Appl. No.: 17/619,112

(22) PCT Filed: Mar. 26, 2020

(86) PCT No.: PCT/CN2020/081441
§ 371 (c)(1),
(2) Date: Dec. 14, 2021

(87) PCT Pub. No.: WO2021/189363
PCT Pub. Date: Sep. 30, 2021

(65) Prior Publication Data
US 2022/0222592 A1    Jul. 14, 2022

(51) Int. Cl.
*G06Q 10/04*    (2023.01)
*G06F 18/23*    (2023.01)
(Continued)

(52) U.S. Cl.
CPC ........... *G06Q 10/04* (2013.01); *G06F 18/23* (2023.01); *G07B 15/02* (2013.01); *G08G 1/142* (2013.01); *G08G 1/148* (2013.01)

(58) Field of Classification Search
None
See application file for complete search history.

(56) References Cited

U.S. PATENT DOCUMENTS

| | | | |
|---|---|---|---|
| 9,743,239 B1 | 8/2017 | Mishra | |
| 2018/0232583 A1 | 8/2018 | Wang et al. | |
| 2020/0019585 A1* | 1/2020 | Balu | G06F 17/11 |

FOREIGN PATENT DOCUMENTS

| | | | | |
|---|---|---|---|---|
| CN | 106646353 A | * | 9/2016 | G01S 5/0257 |
| CN | 107230381 A | | 10/2017 | |

(Continued)

OTHER PUBLICATIONS

Liu, Junming. "Data-driven operations management in bike sharing systems." PhD diss., Rutgers University—Graduate School—Newark, 2019. (Year: 2019).*

(Continued)

*Primary Examiner* — Rehana Perveen
*Assistant Examiner* — Kyle H Tseng
(74) *Attorney, Agent, or Firm* — IP Spring

(57) ABSTRACT

A method and an apparatus for determining a service area of a parking lot, a device and a storage medium are provided. The method includes the following: clustering is performed on all first parking lots to obtain at least one second parking lot set according to an initial weight and initial position information of each first parking lot in a first parking lot set; a transition probability matrix corresponding to each second parking lot in each second parking lot set is determined according to the initial weight and the initial position information, where a transition probability in the transition probability matrix is used for indicating a probability that a parking user transfers to another second parking lot in the same second parking lot set when there is no empty parking space in the second parking lot; and a service capacity value of each second parking lot is determined.

9 Claims, 5 Drawing Sheets

(51) Int. Cl.
  *G06Q 50/40* (2024.01)
  *G07B 15/02* (2011.01)
  *G08G 1/14* (2006.01)

(56) References Cited

FOREIGN PATENT DOCUMENTS

| CN | 109033170 A | 12/2018 |
|---|---|---|
| CN | 110288184 A | 9/2019 |
| JP | 2004046416 A | 2/2004 |

OTHER PUBLICATIONS

Dong, Shi, Mingsong Chen, Lei Peng, and Huiyun Li. "Parking rank: A novel method of parking lots sorting and recommendation based on public information." In 2018 IEEE International Conference on Industrial Technology (ICIT), pp. 1381-1386. IEEE, 2018. (Year: 2018).*

Carreira-Perpinán, Miguel A. "A review of mean-shift algorithms for clustering." arXiv preprint arXiv:1503.00687 (2015). (Year: 2015).*

Tilahun, Surafel Luleseged, and Giovanna Di Marzo Serugendo. "Cooperative multiagent system for parking availability prediction based on time varying dynamic Markov chains." Journal of Advanced Transportation 2017, No. 1 (2017): 1760842. (Year: 2017).*

Richter, Felix, Sergio Di Martino, and Dirk C. Mattfeld. "Temporal and spatial clustering for a parking prediction service." In 2014 IEEE 26th International Conference on Tools with Artificial Intelligence, pp. 278-282. IEEE, 2014. (Year: 2014).*

Indriasari, Vini. "Integration of Travel Time Zone for Optimal Siting of Emergency Facilities." PhD diss., Universiti Putra Malaysia, 2008. (Year: 2008).*

Shen, Tong, Kun Hua, and Jiaping Liu. "Optimized public parking location modelling for green intelligent transportation system using genetic algorithms." IEEE Access 7 (2019): 176870-176883. (Year: 2019).*

Zhang, Yu-ru et al. "Research on intelligent parking lot parking guidance method", Journal of Harbin University of Commerce (Natural Sciences Edition), Dec. 15, 2015, pp. 732-734 and 740.

CNIPA, First Office Action for Chinese Patent Application No. 202010225377.2, May 6, 2022, 21 pages.

CNIPA, International Search Report for International Patent Application No. PCT/CN2020/081441, Dec. 30, 2020, 5 pages.

Lu, Qinghao et al., "ParkingRank-D: A Spatial-temporal Ranking Model of Urban Parking Lots in City-wide Parking Guidance System," 2019 IEEE Intelligent Transportation Systems Conference (ITCS), Oct. 30, 2019 (Oct. 30, 2019), pp. 388-393.

* cited by examiner

METHOD AND APPARATUS FOR DETERMINING SERVICE AREA OF PARKING LOT, DEVICE, AND STORAGE MEDIUM

CROSS-REFERENCE TO RELATED APPLICATIONS

This application is the U.S. National Stage filing under 35 U.S.C. § 371 of International Patent Application No. PCT/CN2020/081441, filed on Mar. 26, 2020.

TECHNICAL FIELD

The present application relates to the technical field of computers, and particularly, to a method and an apparatus for determining a service area of a parking lot, and a device and a storage medium.

BACKGROUND

With the rapid increase of numbers of small passenger cars and private cars, existing parking facilities are increasingly difficult to meet an increasing demand for parking. In a central area of a big city, parking users often need to wander around to search for empty spaces, which easily lead to traffic congestion while increasing traffic flow, and even cause traffic accidents. In order to shorten the time spent by parking users in searching for parking lots, a conventional art generally maps quantified parking lot service capability to geographical space through a Voronoi diagram, so as to form mutually exclusive areas of different sizes. Because a coverage result includes a geographic information relationship among the parking lots, a service area of each parking lot can be presented intuitively.

However, a process of determining the service area determined by the existing Voronoi diagram is complicated, and some parking lots with strong service capability can arbitrarily expand the service area and eventually surround other parking lots without boundary restriction, which results in inaccurate parking lot service area and poor applicability. Therefore, how to improve the efficiency and accuracy of determining a service area of a parking lot has become an urgent problem to be solved.

SUMMARY

Embodiments of present application provide a method and an apparatus for determining a service area of a parking lot, and a device and a storage medium, which can improve the efficiency and accuracy of determining a parking lot service area and have high applicability.

In a first aspect, the embodiments of the present application provide a method for determining a service area of a parking lot. The method may include the following operations.

Clustering may be performed on all first parking lots to obtain at least one second parking lot set according to an initial weight and initial position information of each first parking lot in a first parking lot set.

A transition probability matrix corresponding to each second parking lot in each second parking lot set may be determined according to the above initial weight and the above initial position information. A transition probability in the transition probability matrix may be used for indicating a probability that a parking user transfers to another second parking lot in the same second parking lot set when there is no empty parking space in the second parking lot.

A service capacity value of each above second parking lot may be determined according to the above initial weight and the above initial position information.

A service area of each above second parking lot may be determined according to the above initial position information and the above service capacity value.

In a second aspect, the embodiments of the present application provide an apparatus for determining a service area of a parking lot. The apparatus may include a clustering module, a first determination module, a second determination module, and a third determination module.

The clustering module may be configured to perform clustering on all first parking lots to obtain at least one second parking lot set according to an initial weight and initial position information of each first parking lot in a first parking lot set.

The first determination module may be configured to determine a transition probability matrix corresponding to each second parking lot in each second parking lot set according to the above initial weight and the above initial position information. A transition probability in the transition probability matrix may be used for indicating a probability that a parking user transfers to another second parking lot in the same second parking lot set when there is no empty parking space in the second parking lot.

The second determination module may be configured to determine a service capacity value of each above second parking lot according to the above initial weight and the above transition probability matrix.

The third determination module may be configured to determine a service area of each above second parking lot according to the above initial position information and the above service capacity value.

In a third aspect, the embodiments of the present application provide a device. The device may include a processor and a memory. The processor is interconnected with the memory. The memory may be configured to store a computer program supporting a terminal device to execute the method provided by the first aspect and/or any one possible implementation of the first aspect. The computer program includes a program instruction. The processor is configured to call the above program instruction to execute the method provided by the embodiments of the present application.

In a fourth aspect, the embodiments of the present application provide a computer-readable storage medium. The computer-readable storage medium stores a computer program. The computer program is executed by a processor to implement the method provided by the embodiments of the present application.

In the embodiments of the present application, at least one second parking lot set is obtained by performing clustering on the first parking lot set, and then a service area of each second parking lot in each second parking lot set is simultaneously determined, which can improve the efficiency of improving the service area. On another aspect, the probability that each second parking lot in the same second parking lot set transfers to other second parking lots may be determined according to the initial weight and the initial position information of each second parking lot, and then the transition probability matrix of each second parking lot set under the influence of the initial weight and the initial position information may be determined, so as to reflect an interaction relationship among the second parking lots. Further, the service capacity value of each second parking lot may be accurately determined according to the initial weight and the transition probability matrix, so as to constrain a service area boundary of each second parking lot, and improve the connectivity among the service areas of various second parking lots. The applicability is high.

BRIEF DESCRIPTION OF THE DRAWINGS

In order to illustrate the embodiments of the present application or the technical solutions in the conventional art more clearly, the drawings used in the description of the embodiments or the conventional art will be briefly described below. It is apparent that the drawings in the following description are only some embodiments of the present application, and other drawings can be obtained from those skilled in the art according to these drawings without any creative work.

DETAILED DESCRIPTION

The technical solutions in the embodiments of the present application are clearly and completely described in the following with reference to the accompanying drawings in the embodiments of the present application. It is apparent that the described embodiments are merely a part of the embodiments of the present application, but not all of the embodiments. All other embodiments obtained by those of ordinary skill in the art based on the embodiments of the present application without creative efforts fall within the scope of protection of the present application.

Figure 1:
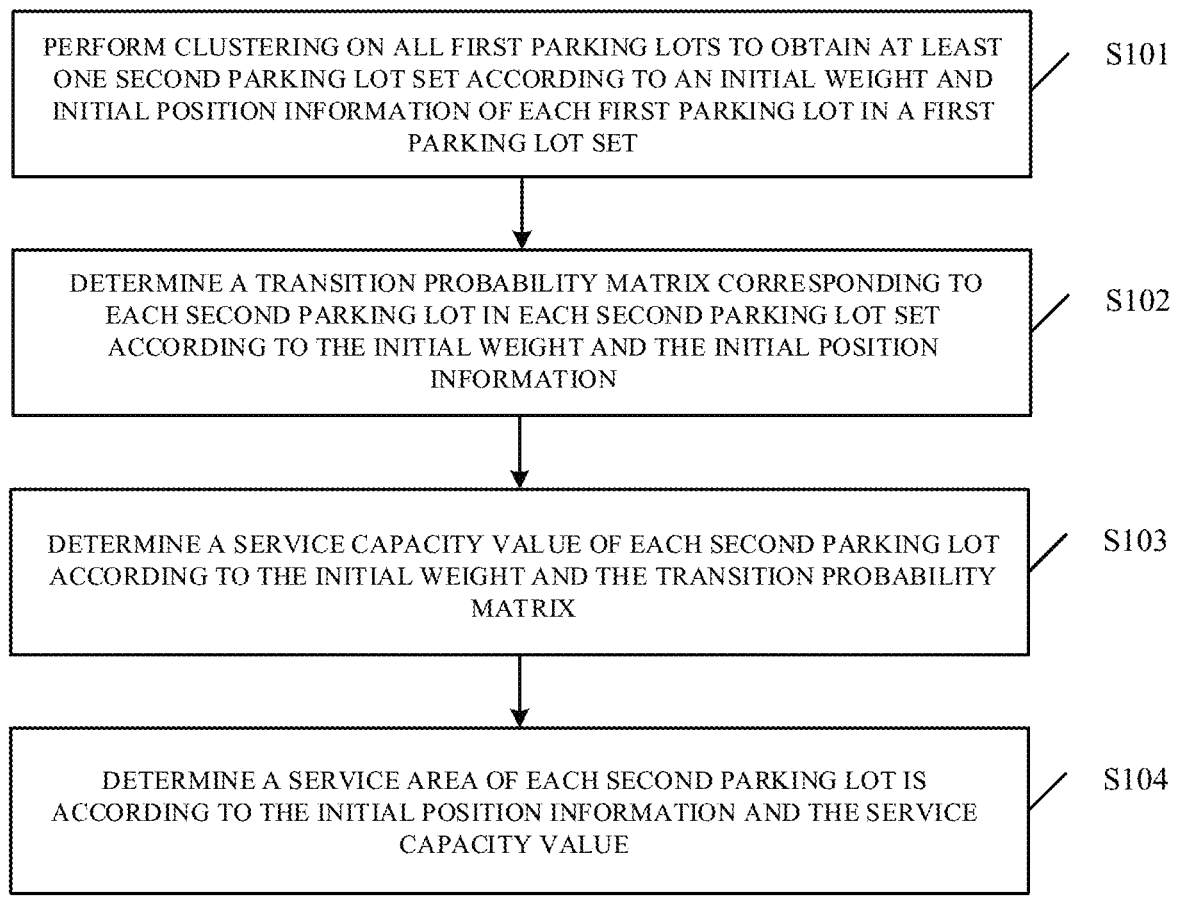
FIG. 1 is a schematic flowchart of a method for determining a service area of a parking lot provided by an embodiment of the present application.

Referring to FIG. 1, FIG. 1 is a schematic flowchart of a method for determining a service area of a parking lot provided by an embodiment of the present application. The method for determining the service area of the parking lot as shown in FIG. 1 may include the following steps S101 to S104.

At S101, clustering is performed on all first parking lots to obtain at least one second parking lot set according to an initial weight and initial position information of each first parking lot in a first parking lot set.

In some feasible implementation modes, the first parking lot set is a parking lot set consisting of all parking lots within a certain area range where all parking lot service areas need to be determined, for example, a parking lot set consisting of all parking lots in an urban administrative area. The parking lot set consisting of all parking lots within a range (for example, 5 km) of a commercial area may specifically be determined according to an actual application scenario, which is not limited here. The initial weight of each parking lot (for convenience of description, referred to as each first parking lot hereinafter) in the first parking lot set is used to represent the initial service capability value of each first parking lot. The initial service capacity value of each first parking lot is the initial service capacity value of each first parking lot for a parking user when the parking space of each first parking lot is empty and the influence of other parking lots due to a distance relationship, a charging relationship, road reasons, etc. is not considered. Specifically, the initial weight of each first parking lot may be determined from the aspects of a parking user range, a number of parking spaces, parking fee information, etc. thereof.

The above parking user range is used to represent the openness degree of the first parking lot. For example, for the first parking lot in a park, it faces all users, so the openness degree of the first parking lot in the park is high. For another example, for the first parking lot in a government building, it mainly faces government employees, so the openness degree of the first parking lot in the government building is low. The openness degree of each first parking lot may range from 0 to 1, 1 represents a highest openness degree, and 0 represents a lowest openness degree. The openness degree of each first parking lot may be determined on the basis of the actual application scenario, which is not limited herein.

The above number of parking spaces represents the number of empty parking spaces and all parking spaces including a parking space in use, i.e., the number of all parking spaces established in each first parking lot.

The above charging fee information may be the fee charged by each first parking lot from parking users for a first hour of parking, or the fee charged by each first parking lot from the parking users for one day of parking, which is specifically determined according to the actual application scenario and is not limited here.

Specifically, a quantization mode of the initial weight of each first parking lot is:

$$PR_i^0 = e^u \frac{v_i / \sum_{j \in P^1} w_j}{1 + w_i / \sum_{j \in P^1} w_j}.$$

That is, for any first parking lot, the more the total parking spaces are, the higher the openness degree is, and the lower the charge is, which means that the initial weight of the first parking lot is greater. Herein, $u_i$ is the parking user range of a parking lot i, $v_i$ is the number of the parking spaces of the parking lot i, $w_i$ is the parking fee information of the parking lot i, and $P^1$ is the first parking lot set. Herein, $\Sigma_{j \in P^1} v_j$ is the total number of the parking spaces of all parking lots in the first parking lot set, $\Sigma_{j \in P^1} w_j$ is the total parking fee information of all first parking spaces in the first parking lot set, for example, when $w_i$ is the fee charged by the parking lot i from the parking users for the first hour of parking, and $\Sigma_{j \in P^1} w_j$ is the sum of the fee charged by all first parking lots in the first parking lot set from the parking users for the first hour of parking.

In some feasible implementation modes, in order to improve the efficiency of determining a service area of each first parking lot, the position information of each first parking lot may be determined when the initial weight of each first parking lot is determined, so as to perform clustering on all first parking lots in a first parking lot set, thus, all the first parking lots in the first parking lot set are divided into at least one parking lot subset in a position dimension (for convenience of description, hereinafter referred to as a second parking lot set). The position information of each parking lot may be the longitude and latitude of each first parking lot to accurately mark a specific location of each first parking lot.

Specifically, when the clustering is performed on all first parking lots in the first parking lot set, an improved Mean-Shift algorithm may be used for implementing. MeanShift clustering is implemented by iteratively moving each first parking lot to a high-density position. During iterative movement, the initial weight of each first parking lot is taken as a weight, so that the first parking lot with high initial weight has less moving distance, and the first parking lot with high initial weight will become the center of each clustering. For n first parking lots with the initial position information of $[L_1, \ldots, L_n]$ and the initial weight of $[PR_1^0, PR_2^0, \ldots PR_n^0]$, the operation that the clustering is performed on the n first parking lots may be described by the following formula:

$$\begin{cases} L^{f+1} = Shift(L^f) \\ L^0 = [P_1, \ldots, P_n] \end{cases}.$$

Herein, $L^f$ represents a moving position of each first parking lot, and f represents a movement number. Function Shift defines a moving mode of all first parking lots:

$$Shift(L^f) = \left[ \frac{\sum_{k_1 \in N_1} PR^0 L_1}{PR_1^0}, \ldots, \frac{\sum_{k_n \in N_n} PR^0 L_n}{PR_n^0} \right].$$

Herein, $N_n$ is an adjacent parking lot of a parking lot n, $N_n = \{L_n | d[L_i, L_j] \leq d_1, j=1, \ldots, n, j \neq i\}$, $d_1$ is a first distance threshold value. When the maximum distance (European distance) of each movement is short enough, the above iteration process stops to complete the clustering of all first parking lots. That is, max $(d [L_i^{n+1}, L_i^n], i=1, \ldots, n) < \varepsilon$, $\varepsilon$ is the first distance threshold value.

Specifically, all first parking lots in the first parking lot set may be moved, and all first parking lots are moved simultaneously each time. Taking one first parking lot in the first parking lot set as an example, when the first parking lot is moved, a distance (Euclidean distance) with the first parking lot and other first parking lots may be determined first, and a first parking lot which has a distance between the first parking lot less than the first distance threshold value may be determined as an adjacent parking lot of the first parking lot. Further, the above first distance threshold value may be determined according to the initial position information of each first parking lot in the first parking lot set, and may also be determined according to the number of the first parking lots in the first parking lot set, which may specifically be determined according to the actual application scenario and is not limited here.

Further, the sum of the initial weights (initial service capacity values) of all adjacent parking lots of the first parking lot may be determined, and the position information of the first parking lot after each movement may be determined according to the position information of the first parking lot before each movement. Based on the above implementation mode, the position information of all first parking lots after each movement may be determined when all first parking lots are moved each time. The adjacent parking lot when the first parking lot is moved each time is the first parking lot which has a distance (Euclidean distance) with the first parking lot less than the first distance threshold value when the first parking lot is moved each time. That is, when the first parking lot is moved each time, the adjacent parking lot of each first parking lot is determined again according to the position information of all parking lots in this movement.

Figure 2:
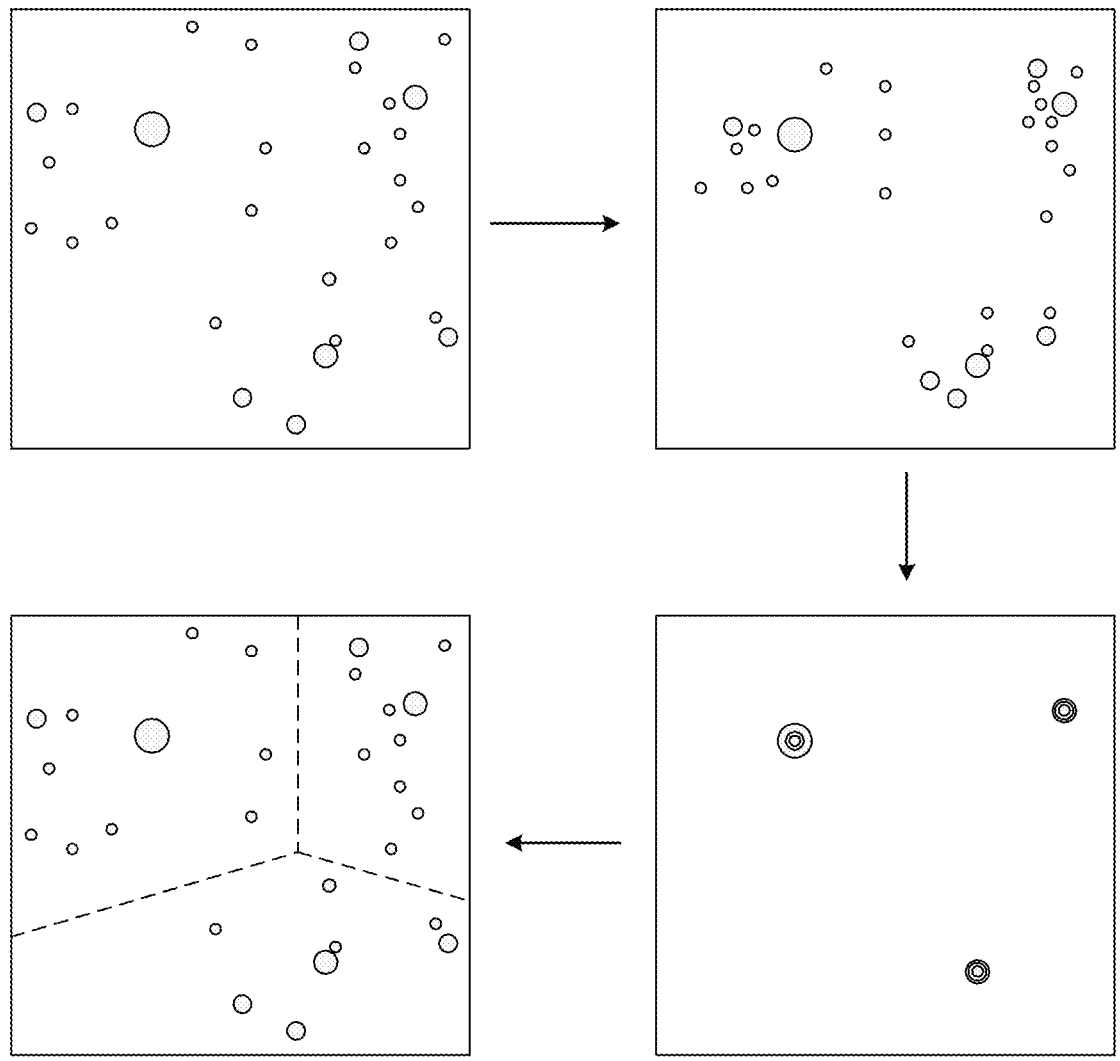
FIG. 2 is a schematic diagram of a scenario for performing clustering on all first parking lots provided by an embodiment of the present application.

Further, after all first parking lots are moved each time, the moving distance (Euclidean distance) between the position information of each first parking lot after each movement and the position information after last movement may be determined. When the longest moving distance of the moving distance of each first parking lot of all first parking lots in each movement is less than the first distance threshold value, the clustering of all first parking lots in the first parking lot set is completed. At this time, at least one clustering area may be obtained in the first parking lot set, that is, the first parking lot with a low initial weight is moved to an adjacent first parking lot with a high initial weight. A plurality of first parking lots in the same clustering are a clustering parking lot set (for convenience of description, hereinafter referred to as the second parking lot set). That is to say, the areas of all first parking lots may be divided by performing clustering on all first parking lots in the first parking lots, and one area is a second parking lot set. Referring to FIG. 2, FIG. 2 is a schematic diagram of a scenario for performing clustering on all first parking lots provided by an embodiment of the present application. In FIG. 2, each point represents a first parking lot, and the size of the point represents the initial weight of the first parking lot. The larger the point is, the greater the initial weight is; and the smaller the point is, the less the initial weight is. After clustering is performed on all points by the above improved MeanShift algorithm, a point with the low initial weight is gradually close to an adjacent point with a great initial weight, and finally three clustering areas are formed. All points (first parking lot) in one clustering local area belong to the same second parking lot set. After the first parking lot in each clustering is remapped to a real position thereof, it is easy to obtain that the first parking lot set includes three second parking lot sets.

Optionally, when the longest moving distance of the moving distance of each first parking lot in all first parking lots in a certain movement is still greater than the first distance threshold value, the above improved Meanshift algorithm is continued to be used to perform clustering on all first parking lots after the current movement until the longest moving distance of the moving distance of each first parking lot in all first parking lots in the certain movement is still less than the first distance threshold value, which will not be elaborated herein.

At S102, a transition probability matrix corresponding to each second parking lot in each second parking lot set is determined according to the initial weight and the initial position information.

In some feasible implementation modes, the transition probability matrix corresponding to each second parking lot may be determined according to the initial weight and the initial position information of each second parking lot in each second parking lot set. Specifically, a parking user can only transit from one second parking lot to another second parking lot when the distance between two second parking lots is short, so the distance between each second parking lot in each second parking lot set and other second parking lots in the same second parking lot set may be determined. Further, a first target distance that is less than or equal to a second distance threshold value is determined, and a first probability that a parking user transfers to a second parking lot corresponding to each first target distance when there is no empty parking space in each second parking lot is determined according to the initial weight of the second parking lot corresponding to the first target distance and an empty parking space rate of each parking lot. A second target distance that is greater than the second distance threshold value is determined, and a second probability that the parking user transfers to the second parking lot corresponding to each second target distance when there is no empty parking space in each second parking lot is determined.

Taking a second parking lot j in one second parking lot set as an example, if the Euclidean distance $d_{ji}$ from the second parking lot j to a second parking lot i is less than or equal to the second distance threshold value $d_2$, connection is established between the second parking lot i and the second parking lot j, and the connection weight is $d_{ij}^{-1} PR_i^0$, that is:

$$A_{ij} = \begin{cases} d_{ij}^{-1} PR_i^0 & \text{if } i \neq j \text{ and } d_{ij} \leq d_2 \\ 0 & \text{otherwise} \end{cases}.$$

Further, the empty parking space rate of the second parking lot i may be an empty parking space rate $q_{it}$ of the second parking lot j, $$q_{it} = \frac{v_{it}}{v_i},$$

$v_i$ represents the total number of parking spaces of the second parking lot i, and $v_{it}$ represents the number of available parking spaces of the second parking lot i at time t, or represents the number of available parking spaces of the second parking lot in a time period t.

When the parking user finds that the parking spaces of the second parking lot j are full, the probability that the parking user goes to the second parking lot i is $$\frac{A_{ij} q_{it}}{\sum_i A_{ij} q_{it}} (1 - q_{jt}).$$

If the Euclidean distance $d_{ji}$ from the second parking lot j to the second parking lot i is less than the second distance threshold value $d_2$, and if the parking user finds that the parking spaces of the second parking lot j are full, the probability that the parking user goes to the second parking lot i is 0. Further, the transition probability matrix $S_t$ corresponding to the second parking lot set (including m second parking spaces) where the second parking j is located may be determined according to the probability $$\frac{A_{ij} q_{it}}{\sum_i A_{ij} q_{it}} (1 - q_{jt})$$

that the parking user goes to the second parking lot i:

$$S_t = \begin{pmatrix} q_{1t} & \frac{A_{12} q_{1t}}{\sum_i A_{i2} q_{it}} (1 - q_{2t}) & \cdots & \frac{A_{1m} q_{1t}}{\sum_i A_{im} q_{it}} (1 - q_{mt}) \\ \frac{A_{m1} q_{mt}}{\sum_i A_{i1} q_{it}} (1 - q_{1t}) & q_{2t} & \cdots & \frac{A_{1m} q_{1t}}{\sum_i A_{im} q_{it}} (1 - q_{mt}) \\ \vdots & \vdots & \ddots & \vdots \\ \frac{A_{m1} q_{mt}}{\sum_i A_{i1} q_{it}} (1 - q_{1t}) & \frac{A_{m2} q_{mt}}{\sum_i A_{i2} q_{it}} (1 - q_{2t}) & \cdots & q_{mt} \end{pmatrix}.$$

Herein, any element in the transition probability matrix $S_t$ represents the probability of the parking user that transfers to another second parking lot in the same second parking lot set when one second parking lot does not have an empty parking space.

At S103, a service capacity value of each second parking lot is determined according to the initial weight and the transition probability matrix.

In some feasible implementation modes, when the service capacity value of each second parking lot is determined, the initial weight of all second parking spaces in each second parking lot set may be constructed as an initial vector corresponding to each second parking lot set. Similarly, taking one second parking lot as an example, the initial weight of all second parking spaces in the second parking lot set may be constructed as a column vector $PR_t$ (i.e., an initial vector of the second parking lot). Herein, one element in the column vector $PR_t$ represents an initial weight of one second parking lot.

Further, iteration is performed on the column vector $PR_t$ and the transition probability matrix $S_t$ corresponding to the same second parking lot set, that is, $PR_t^{r+1} = S_t PR_t^r$, herein, r represents the number of iterations, and when the number of iterations is 0, $PR_t^0$ is the above column vector $PR^t$. It is not difficult to obtain that the column vector $PR^t$ and the transition probability matrix $S_t$ corresponding to the same second parking lot set are multiplied to obtain primary iteration value $PR_t^1$, and the primary iteration value $PR_t^1$ and the transition probability matrix $S_t$ corresponding to the same second parking lot set are further multiplied to obtain a primary iteration value $PR_t^2$, and by parity of reasoning, until $|PR_t^{r+1} - PR_t^r| < \theta$. Herein, $\theta$ is a preset convergence threshold value, that is, when $PR_t^{r+1}$ reaches convergence, the iteration is ended. Assuming that the obtained final iteration value is $PR_t^{r+1}$, then one element in $PR_t^{r+1}$ represents the service capability value of one second parking lot.

Based on the same implementation mode, the final iteration value corresponding to each second parking lot set may be determined respectively, so as to determine the service capability value of each second parking lot in each second parking lot set according to the final iteration value corresponding to each second parking lot. Herein, when the transition probability matrix $S_t$ is determined on the basis of the empty parking space rate of each second parking lot at the time, that is, any element in the transition probability matrix $S_t$ represents that probability that the parking user transfers to another second parking lot in the same second parking lot set when the second parking lot does not have an empty parking space at the time t, one element in $PR_t^{r+1}$ represents the service capacity value of one second parking lot at the time t, and the service capacity value of one second parking lot varies with time. When the transition probability matrix $S_t$ is determined on the basis of the empty parking space rate of each second parking lot in a time period t, that is, any element in the transition probability matrix $S_t$ represents the probability that the parking user transfers to another second parking lot in the same second parking lot set when the second parking lot does not have an empty parking space at in the time period t, one element in $PR_t^{r+1}$ represents the service capacity value of one second parking lot in the time period t.

At S104, a service area of each second parking lot is determined according to the initial position information and the service capacity value.

Figure 3:
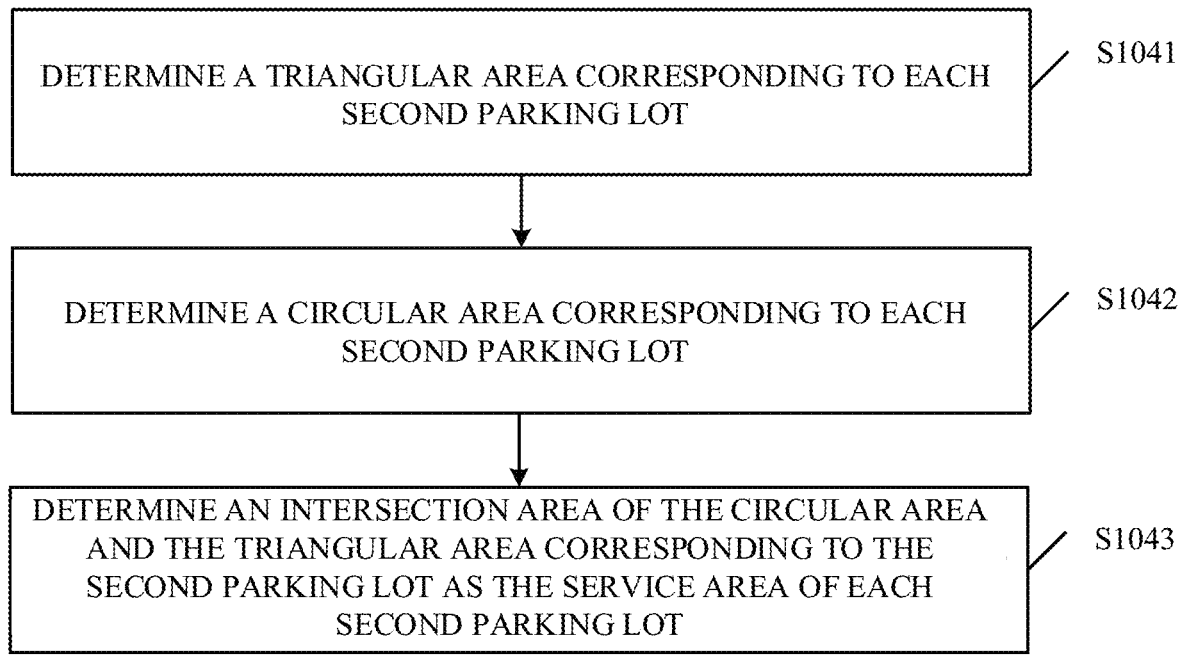
FIG. 3 is a schematic flowchart of a method for determining a service area of a second parking lot provided by an embodiment of the present application.

In some feasible implementation modes, the service area of each second parking lot is determined by a triangular area (a Delaunay triangle) and a circular area (an Apolloniu circle) corresponding to each second parking lot, specifically as shown in FIG. 3. FIG. 3 is a schematic flowchart of a method for determining a service area of a second parking lot provided by an embodiment of the present application. The method for determining the service area of the second parking lot as shown in FIG. 3 may include the following steps S1041 to S1043.

At S1041, a triangular area corresponding to each second parking lot is determined.

In some feasible implementation modes, the triangular area corresponding to each second parking lot is determined by initial position information of each second parking lot and two second parking lots in the same second parking lot set (for convenience of description, hereinafter referred to as two target second parking lots). Herein, a circumscribed circular area of the triangular area (the Delaunay triangle) corresponding to each second parking lot does not contain other parking lots other than the three second parking lots forming the triangular area. Specifically, taking one second parking lot as an example, the initial position information of three second parking lots in the second parking lot set may be arbitrarily selected to form a candidate triangular area, and a circumscribed circular area corresponding to the candidate triangular area may be determined. Further, whether other parking lots other than the above three second parking lots are within the above circumscribed circular area are determined in sequence, and if the other parking lots other than the three second parking lots are not within the circumscribed circular area, it is indicated that the candidate triangular area is one triangular area in the second parking lot set. By parity of reasoning, until all candidate triangular areas of all second parking lots in the second set of parking lot set are traversed to determine all triangular areas in the second set of parking lot set. In addition, each second parking lot in the second parking lot set corresponds to at least one triangular area, that is, each second parking lot is a fixed point of at least one triangular area.

Figure 4:
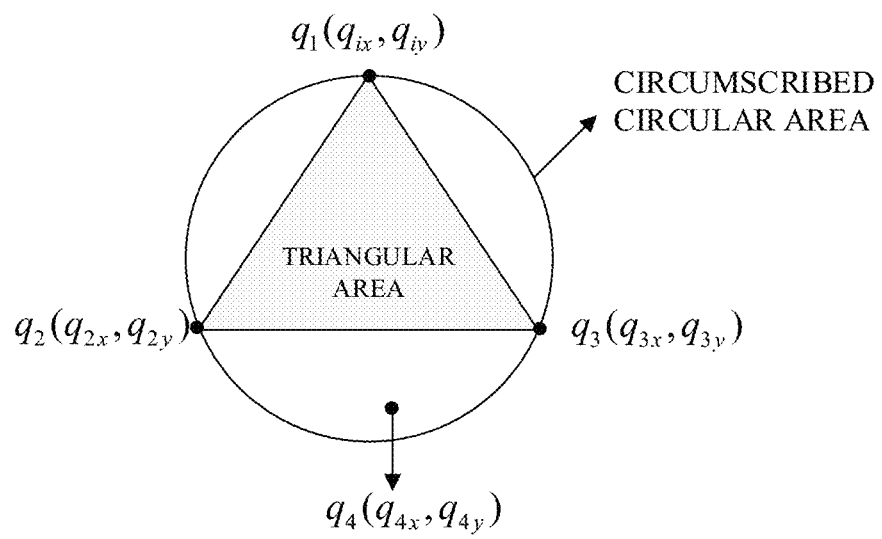
FIG. 4 is a schematic diagram of a scenario for determining a triangular area provided by an embodiment of the present application.

For example, there is a second parking lot set $Q=\{(q_{ix}, q_{iy})|i=1\ldots 6\}$, which includes six second parking lots. At this time, the second parking lot Q includes ten candidate triangular areas, herein, $(q_{ix}, q_{iy})$ represents the initial position information of the second parking lot. Referring to FIG. 4, FIG. 4 is a schematic diagram of a scenario for determining a triangular area provided by an embodiment of the present application. In FIG. 4, three second parking lots $q_1(q_{1x},q_{1y})$, $q_2(q_{2x},q_{2y})$, and $q_3(q_{3x},q_{3y})$ are selected arbitrarily to form a circumscribed circular area of a candidate triangular area:

$$C_{123}(x,y)=(x+b_x/2a)^2+(y+b_y/2a)^2-(b_x^2+b_y^2-4ac)/4a^2$$

Herein, $$a = \begin{vmatrix} p_{1x} & p_{1y} & 1 \\ p_{2x} & p_{2y} & 1 \\ p_{3x} & p_{3y} & 1 \end{vmatrix}, b_x = -\begin{vmatrix} p_{1x}^2 + p_{1y}^2 & p_{1y} & 1 \\ p_{2x}^2 + p_{2y}^2 & p_{2y} & 1 \\ p_{3x}^2 + p_{3y}^2 & p_{3y} & 1 \end{vmatrix},$$

$$b_y = \begin{vmatrix} p_{1x}^2 + p_{1y}^2 & p_{1x} & 1 \\ p_{2x}^2 + p_{2y}^2 & p_{2x} & 1 \\ p_{3x}^2 + p_{3y}^2 & p_{3x} & 1 \end{vmatrix}, \text{ and } c = -\begin{vmatrix} p_{1x}^2 + p_{1y}^2 & p_{1x} & p_{1y} \\ p_{2x}^2 + p_{2y}^2 & p_{2x} & p_{2y} \\ p_{3x}^2 + p_{3y}^2 & p_{3x} & p_{3y} \end{vmatrix}.$$

For the second parking lot $q_4(q_{4x},q_{4y})$ other than the second parking lots $q_1(q_{1x},q_{1y})$, $q_2(q_{2x},q_{2y})$, and $q_3(q_{3x},q_{3y})$, the initial position information of the second parking lot $q_4(q_{4x},q_{4y})$ may be substituted in the above circumscribed circular area $C_{123}(x,y)$, that is, $x=p_{4x}$ and $y=p_{4y}$. When $C_{123}(q_{4x},q_{4y})$ is less than 0, as shown in FIG. 4, the second parking lot $q_4(q_{4x},q_{4y})$ is located in the circumscribed circular area $C_{123}(x,y)$, that is to say, the candidate triangular area formed by the second parking lots $q_1(q_{1x},q_{1y})$, $q_2(q_{2x},q_{2y})$ and $q_3(q_{3x},q_{3y})$, that is, the candidate triangular area is not the triangular area corresponding to any second parking lot of the second parking lots $q_1(q_{1x},q_{1y})$, $q_2(q_{2x},q_{2y})$, and $q_3(q_{3x},q_{3y})$. Assuming that when $C_{123}(q_{4x},q_{4y})$ is greater than 0, whether a second parking lot $q_5(q_{5x},q_{5y})$ and a second parking lot $q_6(q_{6x},q_{6y})$ are located therein may be verified one by one on the basis of the above mode, and when the second parking lots $q_1(q_{1x},q_{1y})$, $q_5(q_{5x},q_{5y})$, and $q_6(q_{6x},q_{6y})$ are all located outside the circumscribed circular area $C_{123}(x,y)$, it may be determined that the candidate triangular area is the triangular area $DT=\{q_1, q_2, q_3\}$ corresponding to the second parking lots $q_1(q_{1x},q_{1y})$, $q_2(q_{2x},q_{2y})$, and $q_3(q_{3x},q_{3y})$.

At S1042, a circular area corresponding to each second parking lot is determined.

In some feasible implementation modes, a circular area (an Apolloniu circle) corresponding to each second parking lot also needs to be determined before determining the triangular area corresponding to each second parking lot. The circular area corresponding to each second parking lot is determined by the initial position information of each second parking lot and one target second parking lot of the above two target second parking lots and the service capacity value at time t, and the above two target second parking lots are other two second parking lots forming a triangular area with each second parking lot. Further, a radius and a circle center of the circular area are determined according to the initial position information and a service capacity value of each second parking lot and one target second parking lot of the two target second parking lots at time t. Then, all circular areas corresponding to each second parking lot is determined according to the radius and the circle center. The ratio of the distance from any position on a boundary of one circular area to each second parking lot to the distance from any position on a boundary of one circular area to one target second parking lot is a constant, and each second parking lot is located in one circular area.

Assuming that the second parking lots $q_1(q_{1x},q_{1y})$, $q_2(q_{2x},q_{2y})$ and $q_3(q_{3x},q_{3y})$ at S1042 form a triangular area $DT=\{q_1, q_2, q_3\}$. When a service area of the second parking lot $q_1(q_{1x},q_{1y})$ needs to be determined, the circular area corresponding to the second parking lot $q_1(q_{1x},q_{1y})$ may be determined. Herein, the second parking lot $q_1(q_{1x},q_{1y})$ forms a circular area $AC(q_1,q_2)$ with the second parking lot $q_2(q_{2x},q_{2y})$, and forms a circular area $AC(q_1,q_3)$ with the second parking lot $q_3(q_{3x},q_{3y})$.

Figure 5:
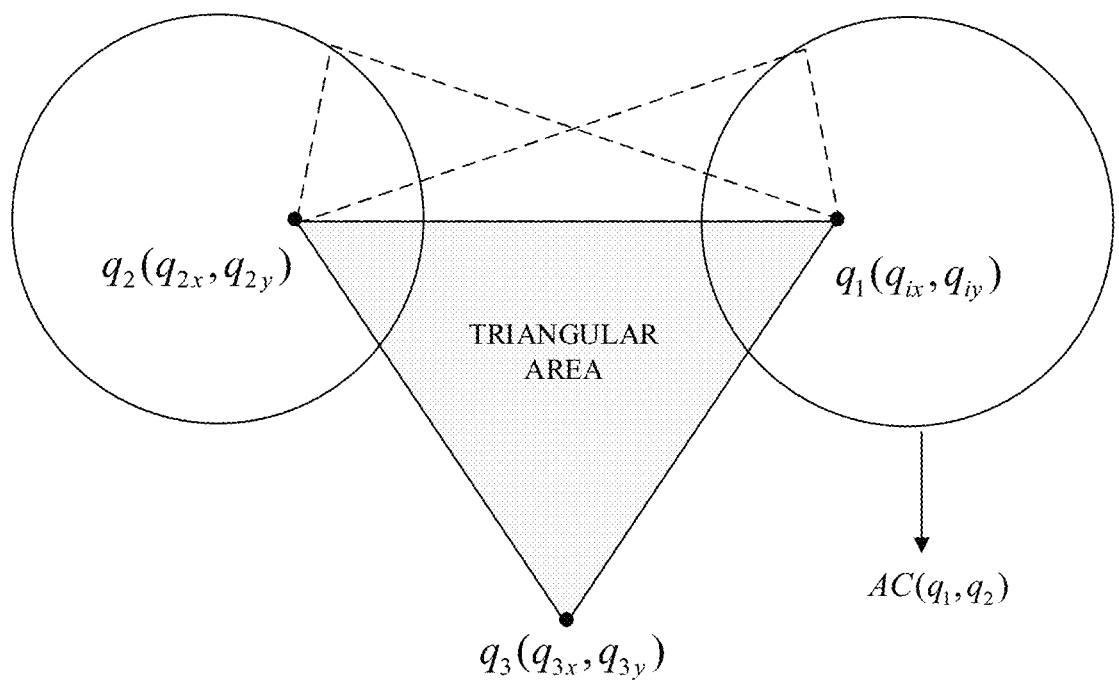
FIG. 5 is a schematic diagram of scenario for determining a circular area provided by an embodiment of the present application.

Herein, the circle center of the circular area $AC(p_1,p_2)$ is $$\left(\frac{q_{1x} - w_1^2 q_{2x}}{1 - w_1^2}, \frac{q_{1y} - w_1^2 q_{2y}}{1 - w_1^2}\right),$$

and the radius is $$\frac{w_1}{1 - w_1^2} d_{12},$$

herein, $d_{12}$ is the Euclidean distance from the second parking lot $q_1(q_{1x},q_{1y})$ to the second parking lot $q_2(q_{2x},q_{2y})$. Herein, $w_1=PR_1/PR_2$, $PR_1$ is the service capacity value of the second parking lot $q_1(q_{1x},q_{1y})$ at time t, and $PR_2$ is the service capacity value of the second parking lot $q_2(q_{2x},q_{2y})$. That is, the ratio of the Euclidean distance from any position on the boundary of the circular area $AC(q_1,q_2)$ to the second parking lot $q_1(q_{1x},q_{1y})$ to the Euclidean distance from any position on the boundary of the circular area $AC(q_1,q_2)$ to the second parking lot $q_2(q_{2x},q_{2y})$ is a constant. As shown in FIG. 5, FIG. 5 is a schematic diagram of scenario for determining a circular area provided by an embodiment of the present application. The triangular area in FIG. 5 is determined by the second parking lots $q_1(q_{1x},q_{1y})$, $q_2(q_{2x},q_{2y})$, and $q_3(q_{3x},q_{3y})$. When the circular area of the second parking lot $q_1(q_{1x},q_{1y})$ is determined on the basis of the second parking lot $q_2(q_{2x},q_{2y})$ in the triangular area $DT=\{q_1, q_2, q_3)\}$, two candidate circular areas corresponding to the second parking lot $q_1(q_{1x},q_{1y})$ may be determined. Since the second parking lot $q_1(q_{1x},q_{1y})$ needs to be located in the circular area when the service area of the second parking lot $q_1(q_{1x},q_{1y})$ is determined, at this time, the candidate circular area including one side of the second parking lot $q_1(q_{1x},q_{1y})$ may be determined as the circular area $AC(q_1,q_2)$ of the second parking lot $q_1(q_{1x},q_{1y})$.

Similarly, a circle center of the circular area $AC(p_1,p_3)$ is $$\left(\frac{q_{1x} - w_2^2 q_{3x}}{1 - w_2^2}, \frac{q_{1y} - w_2^2 q_{3y}}{1 - w_2^2}\right),$$

and the radius is $$\frac{w_2}{1 - w_2^2} d_{13},$$

herein, $d_{13}$ is the Euclidean distance from the second parking lot $q_1(q_{1x},q_{1y})$ to the second parking lot $q_3(q_{3x},q_{3y})$. Herein, $w_2=PR_1/PR_3$, $PR_1$ is the service capacity value of the second parking lot $q_1(q_{1x},q_{1y})$ at time t, and $PR_3$ is the service capacity value of the second parking lot $q_3(q_{3x},q_{3y})$. That is, the ratio of the Euclidean distance from any position on the boundary of the circular area $AC(q_1,q_3)$ to the second parking lot $q_1(q_{1x},q_{1y})$ to the Euclidean distance from any position on the boundary of the circular area $AC(q_1,q_3)$ to the second parking lot $q_3(q_{3x},q_{3y})$ is a constant. Two circular areas corresponding to the second parking lot $q_1(q_{1x},q_{1y})$ may be determined on the basis of the above mode. Since the second parking lot $q_1(q_{1x},q_{1y})$ needs to be located in the circular area when the service area of the second parking lot $q_1(q_{1x},q_{1y})$ is determined, the circular area including the second parking lot $q_1(q_{1x},q_{1y})$ may be determined as the circular area $AC(q_1,q_3)$ of the second parking lot $q_1(q_{1x},q_{1y})$.

At S1043, an intersection area of the circular area and the triangular area corresponding to the second parking lot is determined as the service area of each second parking lot.

Figure 6:
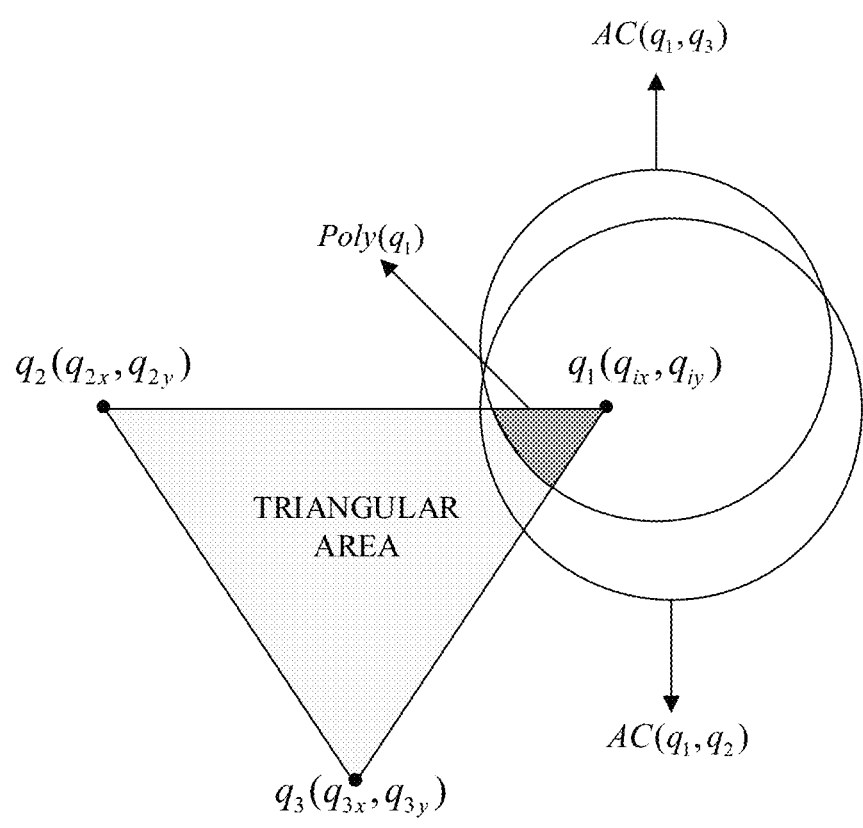
FIG. 6 is a schematic diagram of a scenario for determining a service area provided by an embodiment of the present application.

In some feasible implementation modes, in one second parking lot set, each second parking lot may correspond to at least one triangular area and at least two circular areas. Therefore, for each corresponding second parking lot, the service area corresponding to each second parking lot is the intersection area of the above at least one triangular area and at least two circular areas. The service area of each second parking area represents a coverage area in terms of a parking function and a geographical position. Referring to FIG. 6, FIG. 6 is a schematic diagram of a scenario for determining a service area provided by an embodiment of the present application. The triangular area as shown in FIG. 6 is the triangular area $DT=\{q_1,q_2,q_3)\}$ formed by second parking lots $q_1(q_{1x},q_{1y})$, $q_2(q_{2x},q_{2y})$, and $q_3(q_{3x},q_{3y})$, and the second parking lot $q_1(q_{1x},q_{1y})$ only corresponds to the triangular area $DT=\{q_1,q_2, q_3)\}$, and the circular area of the second parking lot $q_1(q_{1x},q_{1y})$ only has $AC(q_1,q_3)$ and $AC(q_1,q_2)$. At this time, it is not difficult to obtain that the service area of the second parking lot $q_1(q_{1x},q_{1y})$ is:

$$Poly(q_1) = \{(x, y) \mid (x, y) \in AC(q_1, q_2) I\ AC(q_1, q_3) I\ DT(q_1, q_2, q_3)\}.$$

Based on the above mode, it is not difficult to obtain the service area of each second parking lot in each second parking lot set. When the service capacity value of each second parking lot is the service capacity value at time t, the triangular area and the circular area of each second parking lot are both the triangular area and the circular area of each second parking lot at time t. That is to say, the service area of the each second parking lot determined at this time is the service area thereof at time t, and the service area of each second parking lot at different times may be determined in real time along with continuous change of time. When the service capacity value of each second parking lot is the service capacity value within a time period t, the triangular area and the circular time period each second parking lot are both the triangular area and the circular area of each second parking lot within the time period t. That is to say, the service area of each second parking lot determined at this time is the service area thereof within the time period t, and then the service area of each second parking lot may be measured within a certain time.

In the embodiments of the present application, at least one second parking lot set is obtained by performing clustering on the first parking lot set, and then a service area of each second parking lot in each second parking lot set is simultaneously determined, which can improve the efficiency of improving the service area. On another aspect, the service capacity value of each second parking lot may be accurately determined according to the initial weight and the transition probability matrix, so as to constrain a service area boundary of each second parking lot, and improve the connectivity among the service areas of various second parking lots. Further, a service area of each second parking lot at different times may be determined to determine a change trend of the service area of each second parking lot, so that a parking user may select a proper parking lot (with a large service area) at different times, and a parking lot management user may make different parking lot management strategies at different times. Meanwhile, the service of each second parking lot within a certain time period may also be determined to measure the service areas of all parking lots in a certain area from a macro perspective, so as to reasonably plant all parking lots in the area. The applicability is high.

Figure 7:
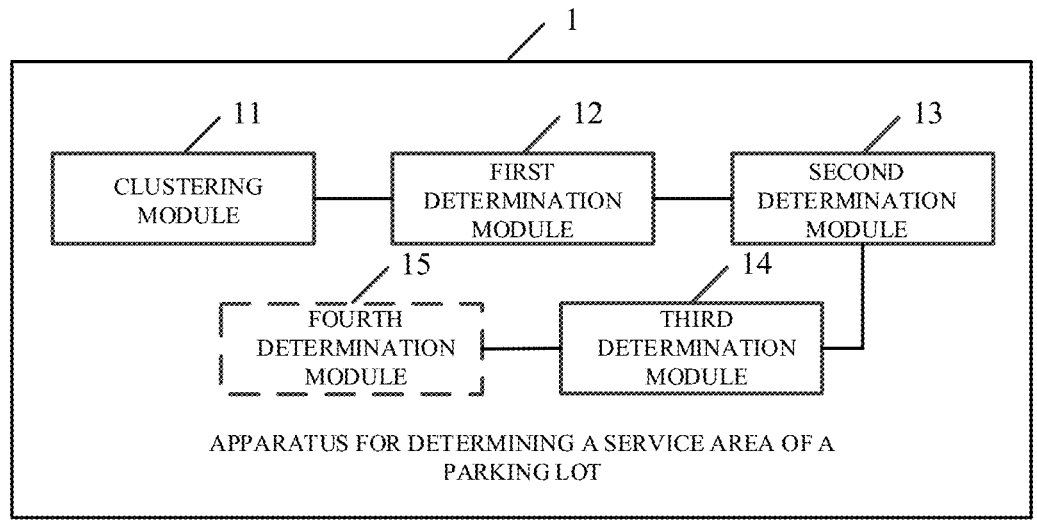
FIG. 7 is a structural schematic diagram of an apparatus for determining a service area of a parking lot provided by an embodiment of the present application.

Referring to FIG. 7, FIG. 7 is a structural schematic diagram of an apparatus for determining a service area of a parking lot provided by an embodiment of the present application. The apparatus 1 provided by the embodiments of the present application includes: a clustering module 11, a first determination module 12, a second determination module 13, and a third determination module 14.

The clustering module 11 is configured to perform clustering on all first parking lots to obtain at least one second parking lot set according to an initial weight and initial position information of each first parking lot in a first parking lot set.

The first determination module 12 is configured to determine a transition probability matrix corresponding to each second parking lot in each second parking lot set according to the above initial weight and the above initial position information. A transition probability in the transition probability matrix is used for indicating a probability that a parking user transfers to another second parking lot in the same second parking lot set when there is no empty parking space in the second parking lot.

The second determination module 13 is configured to determine a service capacity value of each above second parking lot according to the above initial weight and the above transition probability matrix.

The third determination module 14 is configured to determine a service area of each above second parking lot according to the above initial position information and the above service capacity value.

In some feasible implementation modes, the above apparatus 1 further includes a fourth determination module 15. The above fourth determination module 15 is further configured to:

acquire a parking user range, a number of parking spaces, and parking fee information of each first parking lot in the first parking lot set;

determine a total number of parking spaces and total parking fee information of all first parking lots; and determine an initial weight of each parking lot in the above first parking lot set according to the above parking user range, the above number of parking spaces, the above parking fee information, the above total number of parking spaces, and the above total parking fee information.

In some implementation modes, the above clustering module 11 is configured to:

determine position information of all first parking lots after each movement, herein, other first parking lots move simultaneously when each first parking lot moves, the position information of each first parking lot after each movement is determined by the position information of each first parking lot and all adjacent parking lots before each movement of each first parking lot, and the above adjacent parking lots are first parking lots that have the distance with each first parking lot less than a first distance threshold value before each movement of each first parking lot;

determine the moving distance from the position information after each movement of each above first parking lot to the position information after last movement according to the position information of all first parking lots after each movement;

when a target moving distance is less than the first distance threshold value, enable all above first parking lots to stop moving, and determine at least one second parking lot set according to the position information when each above first parking lot stops moving, herein, the target moving distance is the longest distance of the moving distance from the position information of each above first parking lot after each movement to the position information after last movement.

In some implementation modes, the above first determination module 12 is configured to:

determine the distance from each second parking lot in each second parking lot set to other second parking lots in the same second parking lot set according to the initial position information;

determine a first target distance that is less than or equal to a second distance threshold value, and determine a first probability that a parking user transfers to a second parking lot corresponding to each above first target distance when there is no empty parking space in each second parking lot according to the initial weight of the second parking lot corresponding to the above first target distance and an empty parking space rate of each above parking lot;

determine a second target distance that is greater than the second distance threshold value, and determine a second probability that the parking user transfers to the second parking lot corresponding to each above second target distance when there is no empty parking space in each second parking lot; and determine a transition probability matrix corresponding to each above second parking lot set according to the above first probability and the above second probability, herein, the transition probability matrix corresponding to one second parking lot set includes the probabilities that all second parking lots in the one second parking lot set transfer to other second parking lots.

In some implementation modes, the above second determination module 13 is configured to:

determine an initial vector corresponding to each above second parking lot set, herein, a service capacity vector includes initial weights of all second parking lots in each above second parking lot set;

multiply the service capacity vector corresponding to each second parking lot set with the corresponding transition probability matrix to obtain a primary iteration value corresponding to each above second parking lot set;

multiply the above primary iteration value with the above corresponding transition probability matrix to obtain a secondary iteration value corresponding to each above second parking set until obtaining a target iteration value, herein, the difference between the last iteration value of the above target iteration value and the above target iteration value is less than a preset convergence value; and determine the service capacity value of each above second parking lot according to the above target iteration value.

In some implementation modes, the above third determination module 14 is configured to:

determine a triangular area corresponding to each second parking lot, herein, one triangular area is determined by the initial position information of each above second parking lot and two target second parking lots in the same above second parking lot set, and a circumscribed circular area of the above triangular area does not include other second parking lots;

determine a circular area corresponding to each second parking lot, herein, one circular area is determined by the initial position information and the service capacity value of each above second parking lot and one target second parking lot of the above two target second parking lots; and determine an intersection area of the circular area and the triangular area corresponding to each above second parking lot as the service area of each second parking lot.

In some implementation modes, the above third determination module 14 is configured to:

determine a radius and a circle center of the circular area according to the initial position information and the service capacity value of each second parking lot and one target second parking lot of the above two target second parking lots; and determine the above circular area according to above radius and the above circle center to determine all circular areas corresponding to each above second parking lot, herein, the ratio of the distance from any position on a boundary of one circular area to each second parking lot to the distance from any position on a boundary of one circular area to one target second parking lot is a constant, and each above second parking lot is located in the above circular area.

In specific implementations, the above apparatus 1 may execute the implementation modes provided by various steps as described above in FIG. 1 and/or FIG. 3 through various built-in functional modules thereof, and specific reference will be made to the implementation modes provided by the various steps described above, which will not be elaborated herein.

In the embodiments of the present application, at least one second parking lot set is obtained by performing clustering on the first parking lot set, and then a service area of each second parking lot in each second parking lot set is simultaneously determined, which can improve the efficiency of improving the service area. On another aspect, the service capacity value of each second parking lot may be accurately determined according to the initial weight and the transition probability matrix, so as to constrain a service area boundary of each second parking lot, and improve the connectivity among the service areas of various second parking lots. Further, a service area of each second parking lot at different times may be determined to determine a change trend of the service area of each second parking lot, so that a parking user may select a proper parking lot (with a large service area) at different times, and a parking lot management user may make different parking lot management strategies at different times. Meanwhile, the service of each second parking lot within a certain time period may also be determined to measure the service areas of all parking lots in a certain area from a macro perspective, so as to reasonably plant all parking lots in the area. The applicability is high.

Figure 8:
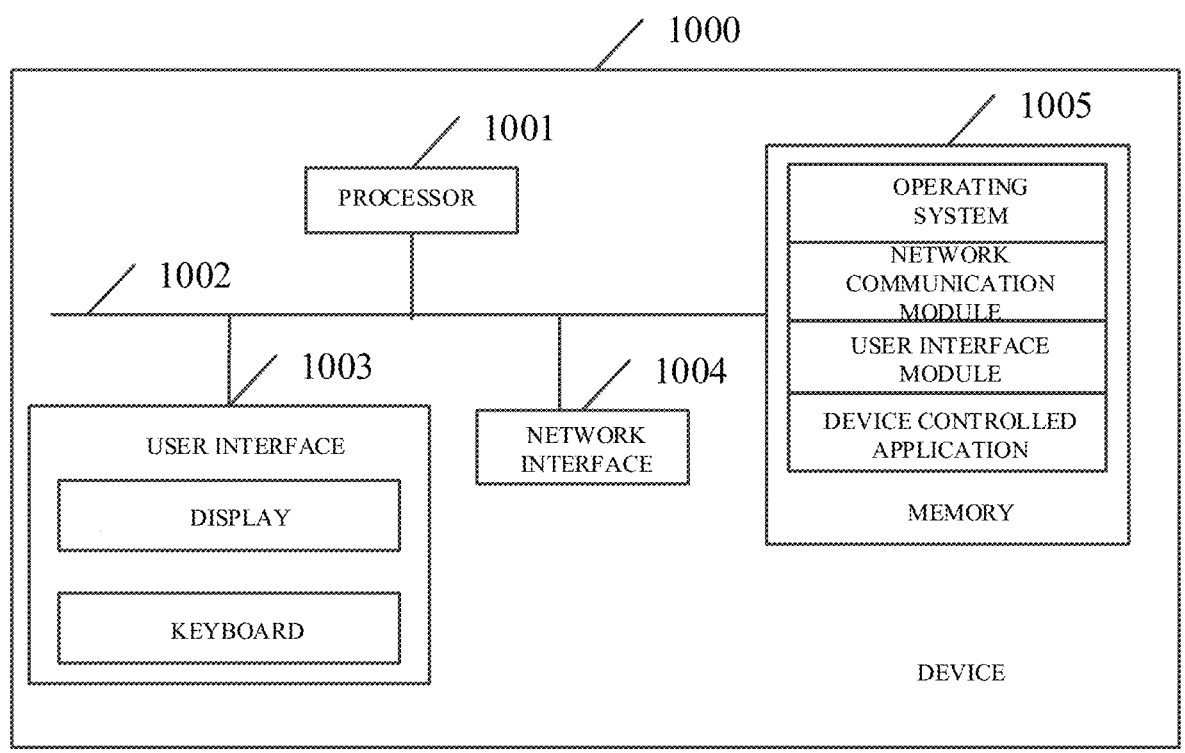
FIG. 8 is a structural schematic diagram of a device provided by an embodiment of the present application.

Referring to FIG. 8, FIG. 8 is a structural schematic diagram of a device provided by an embodiment of the present application. As shown in FIG. 8, the device 1000 in the present embodiment may include: a processor 101, a network interface 1004, and a memory 1005. In addition, the above device 1000 may also include: a user interface 1003 and at least one communication bus 1002. The communication bus 1002 is configured to implement connection communication among these components. The communication interface 1003 may include a display screen and a keyboard, and optionally, the communication interface 1003 may also include a standard wired interface and a standard wireless interface. Optionally, the communication interface 1004 may include a standard wired interface and a standard wireless interface (for example, a WI-FI interface). The memory 1004 may be a high-speed Random-Access Memory (RAM) memory, and may also be a non-volatile memory, for example, at least one magnetic disc memory. Optionally, the memory 1005 may also be at least one storage device located remotely from the aforementioned processor 1001. As shown in FIG. 8, the memory 1005 as a computer-readable storage medium may include an operating system, a network communication module, a user interface module, and a device control application.

In the device 1000 shown in FIG. 8, the network interface 1004 may provide a network communication function. The user interface 1003 is mainly configured to provide an input interface for a user. The processor 1001 may be configured to call the device control application stored in the memory 1005 to implement the following operations.

Clustering is performed on all first parking lots to obtain at least one second parking lot set according to an initial weight and initial position information of each first parking lot in a first parking lot set.

A transition probability matrix corresponding to each second parking lot in each second parking lot set may be determined according to the above initial weight and the above initial position information. A transition probability in the transition probability matrix may be used for indicating a probability that a parking user transfers to another second parking lot in the same second parking lot set when there is no empty parking space in the second parking lot.

A service capacity value of each above second parking lot is determined according to the above initial weight and the above transition probability matrix.

A service area of each above second parking lot is determined according to the above initial position information and the above service capacity value.

In some implementation modes, the above processor 1001 is further configured to:

acquire a parking user range, a number of parking spaces, and parking fee information of each first parking lot in the first parking lot set;

determine a total number of parking spaces and total parking fee information of all first parking lots; and determine an initial weight of each parking lot in the above first parking lot set according to the above parking user range, the above number of parking spaces, the above parking fee information, the above total number of parking spaces, and the above total parking fee information.

In some implementation modes, the above processor 1001 is configured to:

determine position information of all first parking lots after each movement, herein, other first parking lots move simultaneously when each first parking lot moves, the position information of each first parking lot after each movement is determined by the position information of each first parking lot and all adjacent parking lots before each movement of each first parking lot, and the above adjacent parking lots are first parking lots that have the distance with each first parking lot less than a first distance threshold value before each movement of each first parking lot;

determine the moving distance from the position information after each movement of each above first parking lot to the position information after last movement according to the position information of all first parking lots after each movement; and when a target moving distance is less than the first distance threshold value, enable all above first parking lots to stop moving, and determine at least one second parking lot set according to the position information when each above first parking lot stops moving, and the target moving distance is the longest distance of the moving distance from the position information of each above first parking lot after each movement to the position information after last movement.

In some implementation modes, the above processor 1001 is configured to:

determine the distance from each second parking lot in each second parking lot set to other second parking lots in the same second parking lot set according to the initial position information;

determine a first target distance that is less than or equal to a second distance threshold value, and determine a first probability that a parking user transfers to a second parking lot corresponding to each above first target distance when there is no empty parking space in each second parking lot according to the initial weight of the second parking lot corresponding to the above first target distance and an empty parking space rate of each above parking lot;

determine a second target distance that is greater than the second distance threshold value, and determine a second probability that the parking user transfers to the second parking lot corresponding to each above second target distance when there is no empty parking space in each second parking lot; and determine a transition probability matrix corresponding to each above second parking lot set according to the above first probability and the above second probability, and the transition probability matrix corresponding to one second parking lot set includes the probabilities that all second parking lots in above one second parking lot set transfer to other second parking lots In some implementation modes, the above processor 1001 is configured to:

determine an initial vector corresponding to each above second parking lot set, herein, the above service capacity vector includes initial weights of all second parking lots in each above second parking lot;

multiply the service capacity vector corresponding to each second parking lot set with the corresponding transition probability matrix to obtain a primary iteration value corresponding to each above second parking lot set;

multiply the above primary iteration value with the above corresponding transition probability matrix to obtain a secondary iteration value corresponding to each above second parking set until obtaining a target iteration value, herein, the difference between the last iteration value of the above target iteration value and the above target iteration value is less than a preset convergence value; and determine a service capacity value of each above second parking pot according to the above target iteration value.

In some implementation modes, the above processor 1001 is configured to:

determine a triangular area corresponding to each second parking lot, herein, one triangular area is determined by the initial position information of each above second parking lot and two target second parking lots in the same above second parking lot set, and a circumscribed circular area of the above triangular area does not include other second parking lots;

determine a circular area corresponding to each second parking lot, herein, one circular area is determined by the initial position information and the service capacity value of each above second parking lot and one target second parking lot of the above two target second parking lots; and determine an intersection area of the circular area and the triangular area corresponding to each above second parking lot as the service area of each above second parking lot.

In some implementation modes, the above processor 1001 is configured to:

determine a radius and a circle center of the circular area according to the initial position information and the service capacity value of each second parking lot and one target second parking lot of the above two target second parking lots; and determine the above circular area according to the above radius and the above circle center to determine all circular areas corresponding to each above second parking lot, herein, the ratio of the distance from any position on a boundary of one circular area to each second parking lot to the distance from any position on a boundary of one circular area to one target second parking lot is a constant, and each above second parking lot is located in the above circular area.

It is to be understood that in some feasible implementation modes, the above processor 1001 may be a Central Processing Unit (CPU), and the processor may also be other general-purpose processors, Digital Signal Processors (DSP), Application Specific Integrated Circuits (ASIC), and Field-Programmable Gate Arrays (FPGA) or other programmable logic devices, discrete gate or transistor logic devices, discrete hardware components, etc. The general-purpose processor may be a microprocessor, or any conventional processor. The memory may include a read-only memory and a random access memory, and provide instructions and data for the processor. Part memories may also include a non-volatile random access memory. For example, the memory may also store information of a device type.

In specific implementations, the above device 1000 may execute the implementation modes provided by various steps as described above in FIG. 1 and/or FIG. 3 through various built-in functional modules thereof, and specific reference will be made to the implementation modes provided by the various steps described above, which will not be elaborated herein.

In the embodiments of the present application, at least one second parking lot set is obtained by performing clustering on the first parking lot set, and then a service area of each second parking lot in each second parking lot set is simultaneously determined, which can improve the efficiency of improving the service area. On another aspect, the service capacity value of each second parking lot may be accurately determined according to the initial weight and the transition probability matrix, so as to constrain a service area boundary of each second parking lot, and improve the connectivity among the service areas of various second parking lots. Further, a service area of each second parking lot at different times may be determined to determine a change trend of the service area of each second parking lot, so that a parking user may select a proper parking lot (with a large service area) at different times, and a parking lot management user may make different parking lot management strategies at different times. Meanwhile, the service of each second parking lot within a certain time period may also be determined to measure the service areas of all parking lots in a certain area from a macro perspective, so as to reasonably plant all parking lots in the area. The applicability is high.

The embodiments of the present application further provide a computer-readable storage medium. The computer-readable storage medium stores a computer program which is executed by a processor to implement the method provided by various steps in FIG. 1 and FIG. 3. Specific reference will be made to the implementation modes provided by the various steps described above, which will not be elaborated herein.

The above computer-readable storage medium may be an internal storage unit of a task processing apparatus provided by any of the foregoing embodiments, such as a hard disk or a memory of an electronic device. The computer-readable storage medium may also be an external storage device of the electronic device, such as a plug-in hard disk, a Smart Media Card (SMC), a Secure Digital (SD) card, a flash card, etc. arranged on the electronic device. The above computer-readable storage medium may further include a magnetic disk, an optical disk, a Read-Only Memory (ROM), or a Random Access Memory (RAM), etc. Further, the computer-readable storage medium may also include both an internal storage unit and an external storage device of the electronic device. The computer-readable storage medium is configured to store the computer program and other programs and data required by the electronic device. The computer-readable storage medium may also be configured to temporarily store data that has been output or is to be output.

The terms "first", "second" and the like in the claims, description, and drawings of the present application are used to distinguish different objects, and do not need to describe a specific sequence. In addition, the terms "include" and "have" and any variations thereof are intended to cover non-exclusive inclusions. For example, a process, a method, a system, a product or a device including a series of steps or units is not limited to the listed steps or units, but optionally also includes steps or units not listed, or optionally includes other steps or units inherent to these processes, methods, products or devices. References to "embodiment" herein mean that a particular feature, structure, or characteristic described in combination with the embodiments can be included in at least one embodiment of the present application. The appearances of the phrases in various places in the specification are not necessarily referring to the same embodiments, and are not independent or alternative embodiments that are mutually exclusive to other embodiments. Those skilled in the art will explicitly and implicitly understand that the embodiments described herein can be combined with other embodiments. The term "and/or" as used in the specification and the appended claims of the present application refers to and includes any and all possible combinations of one or more of the associated listed items.

Those of ordinary skill in the art will appreciate that elements and algorithm steps of various examples described in combination with the embodiments disclosed herein may be implemented by electronic hardware, computer software, or a combination of them. In order to clearly illustrate the interchangeability of hardware and software, compositions and steps of various examples have been generally described according to the function in the above description. Skilled artisans may implement the described functions in different ways for each specific application, but such implementation should not be considered beyond the scope of the present application.

The above disclosure is only preferred embodiments of the present application, and of course it is not intended to limit the scope of rights of the present application, and thus equivalent changes made according to the claims of the present application are still within the scope of the present application.

What is claimed is:

1. A method for determining a service area of a parking lot for real-time parking guidance, the method being performed by a processor of a device and comprising:

performing, in real time, clustering on all first parking lots to obtain at least one second parking lot set according to an initial weight and initial position information of each first parking lot in a first parking lot set;

determining, in real time, a transition probability matrix corresponding to each second parking lot in each second parking lot set according to the initial weight and the initial position information, wherein a transition probability in a transition probability matrix is used for indicating a probability that a parking user transfers to another second parking lot in the same second parking lot set when there is no empty parking space in the second parking lot;

determining, in real time, a service capacity value of each second parking lot according to the initial weight and the transition probability matrix;

determining, in real time, a respective triangular area corresponding to each second parking lot, wherein the respective triangular area corresponding to each second parking lot is determined by the initial position information of each second parking lot and two target second parking lots in the same second parking lot set, and a circumscribed circular area of the respective triangular area corresponding to each second parking lot does not contain other second parking lots;

determining, in real time, a respective circular area corresponding to each second parking lot, wherein the respective circular area corresponding to each second parking lot is determined by the initial position information and the service capacity value of each second parking lot and one of the two target second parking lots; and determining, in real time, an intersection area between the respective circular area corresponding to each second parking lot and the respective triangular area corresponding to each second parking lot as the service area of each second parking lot, wherein the service area of each second parking lot is used for the parking user to select a parking lot and a parking lot management user to make a parking lot management strategy, wherein the performing, in real time, clustering on all first parking lots to obtain at least one second parking lot set comprises:

performing, in real time, iterative movement on each first parking lot:

determining, in real time, position information of all first parking lots after each iterative movement, wherein other first parking lots move simultaneously when each first parking lot moves, the position information of each first parking lot after each iterative movement is determined by the position information of each first parking lot and initial weights of all adjacent parking lots before each iterative movement of each first parking lot, and the adjacent parking lots are first parking lots that have a distance with each first parking lot less than a first distance threshold value before each iterative movement of each first parking lot;

determining, in real time, a moving distance from the position information after each iterative movement of each first parking lot to the position information after last iterative movement according to the position information of all first parking lots after each iterative movement; and continuing to perform, in real time, the iterative movement on each first parking lot when a target moving distance is not less than the first distance threshold value; when the target moving distance is less than the first distance threshold value, enabling, in real time, all first parking lots to stop moving, and determining, in real time, at least one second parking lot set according to the position information when each first parking lot stops moving, wherein the target moving distance is a longest distance of the moving distance from the position information of each first parking lot after each iterative movement to the position information after last iterative movement.

2. The method of claim 1, further comprising:
acquiring a parking user range, a number of parking spaces, and parking fee information of each first parking lot in the first parking lot set;
determining a total number of parking spaces and total parking fee information of all first parking lots; and
determining an initial weight of each parking lot in the first parking lot set according to the parking user range, the number of parking spaces, the parking fee information, the total number of parking spaces, and the total parking fee information.

3. The method of claim 1, wherein the determining the transition probability matrix corresponding to each second parking lot in each second parking lot set according to the initial weight and the initial position information comprises:
determining a distance from each second parking lot in each second parking lot set to other second parking lots in the same second parking lot set according to the initial position information;
determining a first target distance that is less than or equal to a second distance threshold value, and determining a first probability that the parking user transfers to a second parking lot corresponding to each first target distance when there is no empty parking space in each second parking lot according to the initial weight of the second parking lot corresponding to the first target distance and an empty parking space rate of each parking lot;
determining a second target distance that is greater than the second distance threshold value, and determining a second probability that the parking user transfers to the second parking lot corresponding to each second target distance when there is no empty parking space in each second parking lot; and
determining a transition probability matrix corresponding to each second parking lot set according to the first probability and the second probability, and the transition probability matrix corresponding to one second parking lot set comprises the probabilities that all second parking lots in the one second parking lot set transfer to other second parking lots.

4. The method of claim 1, wherein the determining the service capacity value of each second parking lot according to the transition probability matrix comprises:
determining an initial vector corresponding to each second parking lot set, wherein a service capacity vector includes initial weights of all second parking lots in each second parking lot set;
multiplying the service capacity vector corresponding to each second parking lot set with the corresponding transition probability matrix to obtain a primary iteration value corresponding to each second parking lot set;
multiplying the primary iteration value with the corresponding transition probability matrix to obtain a secondary iteration value corresponding to each second parking set until obtaining a target iteration value, wherein a difference between the last iteration value of the target iteration value and the target iteration value is less than a preset convergence value; and
determining the service capacity value of each second parking lot according to the target iteration value.

5. The method of claim 1, wherein the determining the respective circular area corresponding to each second parking lot comprises:
determining a radius and a circle center of the circular area according to the initial position information and the service capacity value of each second parking lot and one target second parking lot of the two target second parking lots; and
determining the circular area according to the radius and the circle center to determine all circular areas corresponding to each second parking lot, wherein a ratio of a distance from any position on a boundary of one circular area to each second parking lot to a distance from any position on a boundary of one circular area to one target second parking lot is a constant, and each second parking lot is located in the circular area.

6. A device for determining a service area of a parking lot for real-time parking guidance, comprising a processor and a memory, wherein:
the processor is interconnected with the memory;
the memory is configured to store a computer program, the computer program comprises a program instruction, and the processor is configured to call the program instruction to:
perform, in real time, clustering on all first parking lots to obtain at least one second parking lot set according to an initial weight and initial position information of each first parking lot in a first parking lot set;
determine, in real time, a transition probability matrix corresponding to each second parking lot in each second parking lot set according to the initial weight and the initial position information, wherein a transition probability in a transition probability matrix is used for indicating a probability that a parking user transfers to another second parking lot in the same second parking lot set when there is no empty parking space in the second parking lot;
determine, in real time, a service capacity value of each second parking lot according to the initial weight and the transition probability matrix;
determine, in real time, a respective triangular area corresponding to each second parking lot, wherein the respective triangular area corresponding to each second parking lot is determined by the initial position information of each second parking lot and two target second parking lots in the same second parking lot set, and a circumscribed circular area of the respective triangular area corresponding to each second parking lot does not contain other second parking lots;
determine, in real time, a respective circular area corresponding to each second parking lot, wherein the respective circular area corresponding to each second parking lot is determined by the initial position information and the service capacity value of each second parking lot and one of the two target second parking lots; and
determine, in real time, an intersection area between the respective circular area corresponding to each second parking lot and the respective triangular area corresponding to each second parking lot as a service area of each second parking lot, wherein the service area of each second parking lot is used for the parking user to select a parking lot and a parking lot management user to make a parking lot management strategy; and the processor configured to perform, in real time, clustering on all first parking lots to obtain at least one second parking lot set is configured to:
  perform, in real time, iterative movement on each first parking lot;
  determine, in real time, position information of all first parking lots after each iterative movement, wherein other first parking lots move simultaneously when each first parking lot moves, the position information of each first parking lot after each iterative movement is determined by the position information of each first parking lot and initial weights of all adjacent parking lots before each iterative movement of each first parking lot, and the adjacent parking lots are first parking lots that have a distance with each first parking lot less than a first distance threshold value before each iterative movement of each first parking lot:
  determine, in real time, a moving distance from the position information after each iterative movement of each first parking lot to the position information after last iterative movement according to the position information of all first parking lots after each iterative movement; and
  continue to perform, in real time, the iterative movement on each first parking lot when a target moving distance is not less than the first distance threshold value; when the target moving distance is less than the first distance threshold value, enable, in real time, all first parking lots to stop moving, and determine, in real time, at least one second parking lot set according to the position information when each first parking lot stops moving, wherein the target moving distance is a longest distance of the moving distance from the position information of each first parking lot after each iterative movement to the position information after last iterative movement.

7. The device of claim 6, wherein the processor is configured to call the program instruction to:
  acquire a parking user range, a number of parking spaces, and parking fee information of each first parking lot in the first parking lot set;
  determine a total number of parking spaces and total parking fee information of all first parking lots; and
  determine an initial weight of each parking lot in the first parking lot set according to the parking user range, the number of parking spaces, the parking fee information, the total number of parking spaces, and the total parking fee information.

8. The device of claim 6, wherein the processor configured to determine the transition probability matrix corresponding to each second parking lot in each second parking lot set according to the initial weight and the initial position information is configured to:
  determine a distance from each second parking lot in each second parking lot set to other second parking lots in the same second parking lot set according to the initial position information;
  determine a first target distance that is less than or equal to a second distance threshold value, and determine a first probability that the parking user transfers to a second parking lot corresponding to each first target distance when there is no empty parking space in each second parking lot according to the initial weight of the second parking lot corresponding to the first target distance and an empty parking space rate of each parking lot;
  determine a second target distance that is greater than the second distance threshold value, and determine a second probability that the parking user transfers to the second parking lot corresponding to each second target distance when there is no empty parking space in each second parking lot; and
  determine a transition probability matrix corresponding to each second parking lot set according to the first probability and the second probability, and the transition probability matrix corresponding to one second parking lot set comprises the probabilities that all second parking lots in the one second parking lot set transfer to other second parking lots.

9. The device of claim 6, wherein the processor configured to determine the service capacity value of each second parking lot according to the transition probability matrix is configured to:
  determine an initial vector corresponding to each second parking lot set, wherein a service capacity vector includes initial weights of all second parking lots in each second parking lot set;
  multiply the service capacity vector corresponding to each second parking lot set with the corresponding transition probability matrix to obtain a primary iteration value corresponding to each second parking lot set;
  multiply the primary iteration value with the corresponding transition probability matrix to obtain a secondary iteration value corresponding to each second parking set until obtaining a target iteration value, wherein a difference between the last iteration value of the target iteration value and the target iteration value is less than a preset convergence value; and
  determine the service capacity value of each second parking lot according to the target iteration value.

* * * * *